US012370501B2

(12) United States Patent
Schneider et al.

(10) Patent No.: US 12,370,501 B2
(45) Date of Patent: Jul. 29, 2025

(54) REACTIVE ADDITIVES IN MEMBRANE PREPARATION

(71) Applicant: Solventum Intellectual Properties Company, Maplewood, MN (US)

(72) Inventors: Frank Schneider, Neuss (DE); Stefan Weuster, Neuss (DE); Daniel P. Malek, Neuss (DE); Mathias Stroschke, Neuss (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 839 days.

(21) Appl. No.: 17/610,683

(22) PCT Filed: Jun. 23, 2020

(86) PCT No.: PCT/IB2020/055925
§ 371 (c)(1),
(2) Date: Nov. 11, 2021

(87) PCT Pub. No.: WO2020/261116
PCT Pub. Date: Dec. 30, 2020

(65) Prior Publication Data
US 2022/0203308 A1 Jun. 30, 2022

(51) Int. Cl.
*B01D 61/14* (2006.01)
*B01D 69/08* (2006.01)
*B01D 71/38* (2006.01)
*B01D 71/68* (2006.01)
*B01D 71/82* (2006.01)

(52) U.S. Cl.
CPC ........... *B01D 69/08* (2013.01); *B01D 61/147* (2013.01); *B01D 69/087* (2013.01); *B01D 71/381* (2022.08); *B01D 71/68* (2013.01); *B01D 71/82* (2013.01); *B01D 2323/02* (2013.01); *B01D 2323/082* (2022.08); *B01D 2323/12* (2013.01); *B01D 2323/30* (2013.01); *B01D 2323/36* (2013.01)

(58) Field of Classification Search
CPC .... B01D 69/08; B01D 61/147; B01D 69/087; B01D 71/381; B01D 71/68; B01D 71/82; B01D 2323/02; B01D 2323/082; B01D 2323/12; B01D 2323/30; B01D 2323/36; B01D 71/76; B01D 61/145; B01D 61/027; B01D 69/02; B01D 71/80; B01D 2325/36; B01D 2325/38; C02F 1/442; C02F 1/444
See application file for complete search history.

(56) References Cited

U.S. PATENT DOCUMENTS

| 5,886,059 A | 3/1999 | Wang |
| 5,928,774 A | 7/1999 | Wang |
| 2010/0041846 A1 | 2/2010 | Hood |

FOREIGN PATENT DOCUMENTS

| CN | 1177308 | 3/1998 | |
| CN | 103349920 | 10/2013 | |
| CN | 104190265 | 12/2014 | |
| CN | 105709608 | 6/2016 | |
| DE | 10228148 A1 * | 1/2004 | ......... B01D 67/0088 |
| EP | 568045 | 11/1993 | |
| WO | WO 2010-111607 | 9/2010 | |

OTHER PUBLICATIONS

The English Translation of Koo Ja-Young (DE-10228148-A1) Jan. 2004.*
Zhao, "Modification of polyethersulfone membranes—A review of methods", Progress in material sciences, 2013, vol. 58, No. 1, pp. 76-150.
1507 Extended EP Search Report for EP19182942.3, PCT/IB2020/055925, Dec. 4, 2019, 3 pages.
International Search report for PCT International Application No. PCT/IB2020/055925 mailed on Aug. 25, 2020, 4 pages.

* cited by examiner

*Primary Examiner* — Thuan D Dang

(57) ABSTRACT

The present disclosure provides a process for producing a modified microporous membrane, comprising (i) Providing a first solution comprising at least one first polymer and at least one epoxy functional compound; (ii) Providing a second solution comprising at least one diamine compound; (iii) Bringing the first solution and the second solution into contact, thereby obtaining a modified microporous membrane comprising at least one first polymer and the cross-linked reaction product of the at least one epoxy functional compound and the at least one diamine compound; wherein the modified microporous membrane is a hollow-fiber membrane; and wherein the first solution is a dope solution, the second solution is a bore solution, and bringing the first and second solutions into contact takes place in a spinneret.

18 Claims, No Drawings

REACTIVE ADDITIVES IN MEMBRANE PREPARATION

CROSS REFERENCE TO RELATED APPLICATIONS

This application is a national stage filing under 35 U.S.C. 371 of PCT/IB2020/055925, filed Jun. 23, 2020, which claims the benefit of Priority Application No. EP 19182942.3, filed Jun. 27, 2019, the disclosure of which is incorporated by reference in its/their entirety herein.

FIELD

The present disclosure relates to processes for producing a modified microporous membrane. In addition, the present disclosure relates to membranes obtained by such processes. The present disclosure further relates to use of such membranes for filtration and purification of liquid media.

BACKGROUND

Polymer membranes are employed in a very wide range of different industrial, pharmaceutical or medical applications for precision filtration. In these applications, membrane separation processes are gaining in importance, as these processes offer the advantage that the substances to be separated are not thermally burdened or even damaged. Ultrafiltration membranes can be employed for the removal or separation of macromolecules. Numerous further applications of membrane separation processes are known from the beverages industry, biotechnology, water treatment or sewage technology. Such membranes are generally classified according to their retention capacity, i.e. according to their capacity for retaining particles or molecules of a certain size, or with respect to the size of the effective pores, i.e. the size of the pores that determine the separation behaviour. Ultrafiltration membranes thereby cover the size range of the pores determining the separation behaviour between roughly 0.01 and approx. 0.1 µm, so that particles or molecules with a size in the range larger than 20 000 or larger than approx. 200 000 Daltons can be retained.

In many cases, membranes made from sulfone polymers such as polysulfone or polyether sulfone are employed for applications in the ultrafiltration sector, not least due to their high chemical stability towards i.a. acids or alkalis, their temperature stability or the sterilisability of the membranes made from these materials.

U.S. Pat. No. 5,928,774 discloses asymmetric ultrafiltration membranes made from sulfone polymers in the form of flat films. The membranes in U.S. Pat. No. 5,928,774 exhibit a pronounced asymmetry; on their one surface they have a separating layer in the form of a skin, and adjoining this a supporting layer whose pore structure is free from caverns, also known as finger pores or macrovoids, and whose pores gradually become larger starting from the skin towards the second surface. With their pronounced asymmetry, the membranes in U.S. Pat. No. 5,928,774 are optimised towards high transmembrane flows and high dirt-loading capacity in the application. Similar flat membranes with pronounced asymmetry made from a polyether sulfone are also described in U.S. Pat. No. 5,886,059.

As the semi-permeable membranes described in the publications cited above are made from hydrophobic sulfone polymers, they have poor water wettability so that their use is very limited for the filtration of aqueous media. Furthermore, it is known that hydrophobic membranes have a strong, non-specific ability to adsorb e.g. proteins, so that a rapid coating of the membrane surface with predominantly higher molecular constituents from the liquid to be filtered frequently occurs during use, consequently resulting in a deterioration of permeability. This phenomenon is commonly referred to as "membrane fouling". In order to improve the water wettability and hence improve the permeability to aqueous media, and in order to prevent adhesion of proteins to the membrane surface, various attempts have been made to make membranes based on sulfone polymers hydrophilic, while at the same time reducing the tendency to adsorb proteins. According to one of these approaches, hydrophilic polymers such as polyvinylpyrrolidone are admixed to the sulfone polymers in production processes.

EP-A-568045 relates to hydrophilic polysulfone-based hollow-fiber membranes with an asymmetric structure that contain a polyglycol and a vinylpyrrolidone-based polymer to ensure the hydrophilic properties. On their side facing towards the lumen, the hollow-fiber membranes in EP-A-568045 have a 0.1 to 3 µm thick separating layer with slot-like, 0.001 to 0.05 wide pores on the inner surface. This separating layer is adjoined by a supporting layer with network- or sponge-like structure and pores with a mean size of 1 to 5 µm. On the outer surface is a layer with a network- or sponge-like structure that is denser than the supporting layer.

The cut-offs of the membranes in EP-A-568045 can be assigned to the ultrafiltration range, although the membranes are optimised for blood treatment. Permeabilities for water in the order of up to approx. 0.7 ml/cm$^2$·min·bar are cited for the hollow-fiber membranes in the examples given in EP-A-568045. These membranes have a wall thickness of 40 µm, however, and are therefore relatively thin-walled and hence not suitable for ultrafiltration applications due to their insufficient pressure and breakage stability.

There is still a need in the art for processes for producing polymeric membranes, in particular PES membranes, which yield modified membranes having an enhanced hydrophobicity, and ideally have a decreased amount of extractables without any deterioration of filtration or flux/retention properties.

SUMMARY

The present disclosure provides a process for producing a modified microporous membrane, comprising
  (i) Providing a first solution comprising at least one first polymer and at least one epoxy functional compound;
  (ii) Providing a second solution comprising at least one diamine compound;
  (iii) Bringing the first solution and the second solution into contact, thereby obtaining a modified microporous membrane comprising at least one first polymer and the crosslinked reaction product of the at least one epoxy functional compound and the at least one diamine compound;
    wherein the modified microporous membrane is a hollow-fiber membrane; and
    wherein the first solution is a dope solution and the second solution is a bore solution, and bringing the first solution and second solution into contact takes place in a spinneret.

The present disclosure further provides membranes obtained from the processes as described herein.

Furthermore, the present disclosure relates to certain uses of the membranes as described herein in applications in filtration of aqueous media, in particular in virus filtration.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

Parameters as described herein may be determined as described in detail in the experimental section.

Unless explicitly indicated, all preferred ranges and embodiments may be combined freely.

The present disclosure provides a process for producing a modified microporous membrane, comprising
(i) Providing a first solution comprising at least one first polymer and at least one epoxy functional compound;
(ii) Providing a second solution comprising at least one diamine compound;
(iii) Bringing the first solution and the second solution into contact, thereby obtaining a modified microporous membrane comprising at least one first polymer and the crosslinked reaction product of the at least one epoxy functional compound and the at least one diamine compound;
wherein the modified microporous membrane is a hollow-fiber membrane; and
wherein the first solution is a dope solution, the second solution is a bore solution, and bringing the first solution and the second solution into contact takes place in a spinneret.

This process provides a convenient, efficient and reliable method for producing modified membranes, in particular hollow-fiber membranes, which yields microporous membranes modified by crosslinked epoxy compounds. This controlled incorporation of diamine crosslinked epoxy compounds has the effect of providing membranes having an increased hydrophobicity compared to unmodified membranes, reduced extractables, while still exhibiting good flux, filtration and retention properties. This increased and improved hydrophobicity of the membranes obtained by the processes as described herein may have the advantage of an improved wettability of the membranes, a reduced "fouling" behaviour, and also improved filtration and/or retention properties.

The epoxy functional compound is, in general, a hydrocarbon-based compound having at least one epoxy moiety suitable for crosslinking. More specifically, the epoxy functional compound is an oligomer, polymer or copolymer comprising building blocks comprising at least one epoxy moiety. Preferably, the at least one epoxy functional compound is a copolymer comprising building blocks comprising at least one epoxy moiety and at least one aliphatic or aromatic function. In this regard, it is preferred that the at least one epoxy functional compound exhibits an aliphatic backbone. That is, the core carbon-carbon connection between the various building block is preferred to be of aliphatic nature. Furthermore, it is preferred that the building blocks comprising at least one epoxy moiety are selected from aliphatic or aromatic ethers or esters. Preferably, the copolymer further comprises building blocks comprising moieties selected from aliphatic, cyclic or aromatic esters, aliphatic, cyclic or aromatic amides, aliphatic, cyclic or aromatic ethers, aliphatic, cyclic or aromatic sulfones, aliphatic, cyclic or aromatic sulphides, aliphatic, cyclic or aromatic sulphonamides, and/or metal chelating agents. This has the advantage that selected functionalities may be selectively built into the at least one epoxy functional compound. That means that membrane properties may be deliberately and purposefully modified. For example, the hydrophobicity or hydrophilicity may be enhanced, electrical charges may be introduced (e.g. via cations or anions), protein-docket sites, chelating agents, or even medical active agents may be introduced and thereby build into the membrane. This may be advantageous for numerous applications in industry, or, in particular, in the pharmaceutical or medical sector. It is further preferred that the copolymer of the epoxy functional compound as described herein further comprises building blocks selected from building blocks comprising cyclic amides, cyclic or aliphatic esters, and/or aliphatic or cyclic silanes. Preferably, the further building blocks are selected from pyrrolidones, caprolactames, acetates and/or formiates.

It is preferred that the at least one epoxy functional compound has the formula (I)

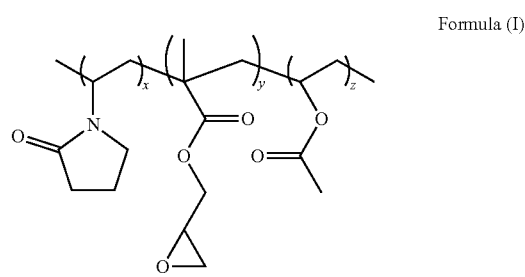

Formula (I)

wherein x, y and z are evenly distributed. Preferably, x+y+z sums up to at least 50, preferably at least 60, more preferably at least 70. In this regard, it is also preferred that x+y+z sums up to 140 and less, preferably 130 and less, and more preferably 120 and less. Preferably, x+y+z sums up to a number in the range of from 50 to 140, preferably from 60 to 130, and more preferably from 70 to 120. Epoxy functional compounds of formula (I) and having x, y and z in these ranges were found to be easily and reliably crosslinked in the processes as described herein, and giving rise to membranes having increased hydrophobicity and decreased extractables compared to membranes not comprising these crosslinked compounds. The first solution used in the process according to the present disclosure comprises the at least one epoxy functional compound in an amount in the range of from 0.1 to 15 wt.-%, preferably in the range of from 0.5 to 10 wt.-%, and more preferably in the range of from 1 to 7 wt.-%, based on the total weight of the first solution.

In general, any diamine known to the skilled person for crosslinking epoxy functional compounds may be used in the scope of the present disclosure as the at least one diamine compound. For obtaining reliable and optimum crosslinking results in the membranes obtained in the processes according to the present disclosure, it is preferred that the at least one diamine compound is selected from polyamines, polyetheramines, polyamidoamides, and any combination and mixtures thereof. For example, diamine compounds suitable for use in the processes according to the present disclosure are the polyetheramines which are commercially available under the trade designation "Jeffamine" from Huntsman Corp. such as "Jeffamine ED-2003". The second solution used in the process according to the present disclosure comprises the at least one diamine in an amount in the range of from 1 to 20 wt.-%, preferably from 2 to 15 wt.-%, more preferably in the range of from 3 to 10 wt.-%, based on the total weight of the second solution.

In the processes according to the present disclosure, membranes are being spun by spinning the homogeneous first solution (i.e. the dope solution) and the second homogeneous solution (i.e. the bore solution) through a spinneret. The first solution comprises the at least one first polymer and the at least one first epoxy functional compound in a solvent system. With regard to the at least one first polymer used in the processes as described herein, basically any polymer known in the art for producing microporous membranes may be employed. Preferably, the at least one first polymer is selected from polyvinylidene fluorides, polyethylenes, and/or polysulfones. These polymers yield stable microporous membranes, which exhibit good filtration properties, good flux as well as good mechanical properties necessary for industrial manufacturing of membranes as well as for numerous applications of the membranes themselves in industry and/or pharmaceutical or medical uses. In the processes as described herein, it is preferred that the at least one first polymer is selected from polysulfones, preferably from polyether sulfones, polyphenylene sulfones or polyarylether sulfones. In particular, hydrophobic aromatic sulfone polymers are preferred.

Advantageous hydrophobic aromatic sulfone polymers which are employed in the method according to the invention are polysulfone, polyether sulfone, polyphenylene sulfone or polyaryl ether sulfone. Preferably, the hydrophobic aromatic sulfone polymer is a polysulfone or a polyether sulfone with the repeating molecular units shown in the following formulae (II) and (III):

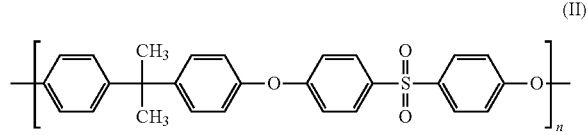

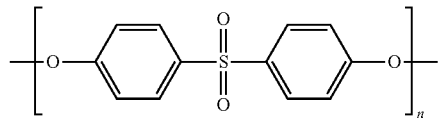

The at least one polymer such as the at least one polysulfone polymer can also contain additives such as antioxidants, nucleating agents, UV absorbers, etc. to selectively modify the properties of the membranes. According to the present disclosure, the concentration of the at least one first polymer in the first solution is preferably in the range of from 10 to 40 wt.-%, preferably from 12 to 35 wt.-%, more preferably from 15 to 30 wt.-%, based on the total weight of the first solution. Below a concentration of 10 wt. %, disadvantages may arise in particular with respect to the mechanical stability of the hollow-fiber membranes obtained. On the other hand, membranes obtained from spinning solutions with more than 40 wt. % of the first polymer may exhibit an excessively dense structure and insufficient permeability.

In this regard, it is preferred that the first solution further comprises at least one second polymer. This at least one second polymer is preferably a hydrophilic polymer or copolymer which is advantageously used in combination with the hydrophobic aromatic sulfone used as the at least one first polymer in the first solution used in the processes as described herein. Long-chain polymers are advantageously employed as the at least one second polymer, i.e. an at least one hydrophilic polymer that on the one hand exhibit a compatibility with the hydrophobic aromatic sulfone polymer and have repeating polymer units that in themselves are hydrophilic. A hydrophilic polymer with a mean molecular weight Mw of more than 10 000 Daltons, preferably of more than 20 000 Daltons, more preferably of more than 30 000 Daltons, is preferably employed. The hydrophilic polymer is preferably polyvinylpyrrolidone, polyethylene glycol, polyvinyl alcohol, polyglycol monoester, a polysorbitate such as polyoxyethylene sorbitan monooleate, carboxymethylcellulose or a modification or copolymer of these polymers, and any combinations and mixtures thereof. Polyvinylpyrrolidone and polyethylene glycol are particularly preferred. In a particular preferred embodiment of the present disclosure, the at least one first polymer is selected from polysulfones as described herein, and the at least one second polymer is selected from polyvinylpyrrolidones.

Within the context of the present disclosure, the at least one hydrophilic polymer can also comprise mixtures of different hydrophilic polymers. The hydrophilic polymer can, for example, be a mixture of chemically different hydrophilic polymers or of hydrophilic polymers with different molecular weights, e.g. a mixture of polymers whose molecular weight differs by a factor of 5 or more. Preferably, the at least one hydrophilic polymer comprises a mixture of polyvinylpyrrolidone or polyethylene glycol with a hydrophilically modified aromatic sulfone polymer. It is also preferred that the hydrophilically modified aromatic sulfone polymer is a sulfonated aromatic sulfone polymer, in particular a sulfonated modification of the hydrophobic aromatic sulfone polymer employed in the membrane and in the method according to the present disclosure. Mixtures of polyether sulfone, sulfonated polyether sulfone and polyvinylpyrrolidone can be particularly advantageously employed. As a result of the presence of a hydrophilically modified aromatic sulfone polymer, hollow-fiber membranes with particularly stable hydrophilic properties in the application are obtained. Preferably, the first solution contains the at least one second polymer in an amount in the range of from 2 to 25 wt.-%, preferably from 5 to 20 wt.-%, and more preferably from 7.5 wt.-% to 15 wt.-%, based on the total weight of the first solution.

The first solution comprises at least one solvent or solvent system matching the at least one first polymer and the at least one second polymer, if present. For example, the solvent system to be employed must be matched to the hydrophobic aromatic sulfone polymer employed and to the at least one hydrophilic polymer so that a homogeneous spinning solution can be produced. The solvent system preferably comprises polar, aprotic solvents such as dimethylformamide, dimethylacetamide, dimethyl sulfoxide, N-methyl pyrrolidone or their mixtures, or protic solvents such as ε-caprolactam. Furthermore, the solvent system can contain up to 80 wt. % latent solvent, whereby in the context of the present invention a latent solvent is understood as a solvent that poorly dissolves the sulfone polymer or dissolves it only at elevated temperature. In cases where ε-caprolactam is used as a solvent, γ-butyrolactone, propylene carbonate or polyalkylene glycol can be employed, for example. In addition, the solvent system can contain non-solvents for the membrane-forming polymer such as water, glycerine, low-molecular polyethylene glycols with a mean molecular weight of less than 1000 Daltons or low-molecular alcohols such as ethanol or isopropanol. In a preferred example of a solvent system according to the present disclosure, the solvent system in the first solution comprises N-methyl pyrrolidone and water. Preferably, the first solution comprises N-methyl pyrrolidone in an amount in the range of from 40 to 80 wt.-%, preferably from 50 to 75 wt.-%, and more preferably from 55 to 70 wt.-%.

After preferably degassing and filtration to remove undissolved particles, the homogeneous first solution is extruded through the annular gap of a conventional hollow-fiber die (i.e. the spinneret) to produce a hollow fiber. The second solution (or bore solution), i.e. an interior filler comprising the at least one diamine compound and that may be a coagulation medium for the hydrophobic aromatic sulfone polymer and at the same time stabilises the lumen of the hollow fiber is extruded through the central nozzle opening arranged coaxially to the annular gap in the hollow-fiber die/the spinneret. Within the present disclosure, the terms "hollow-fiber die" and "spinneret" may be used interchangeably. The second solution preferably comprises at least one solvent selected from dimethylformamide, dimethylacetamide, dimethyl sulfoxide, and N-methyl pyrrolidone and any combinations and mixtures thereof. Preferably, the second solution further comprises non-solvents for the membrane-forming polymer such as water, glycerine, low-molecular polyethylene glycols with a mean molecular weight of less than 1000 Daltons or low-molecular alcohols such as ethanol or isopropanol, and/or protic solvents such as caprolactam. For example, the second solution may comprise water and glycerol, but may also comprise additional ingredients and/or solvents.

The width of the annular gap and the inside diameter of the central nozzle opening may be selected according to the desired properties of the hollow-fiber membrane as known in the art. That is, the spinneret may exhibit a spinneret outer diameter for dope in the range of from 1100 to 3000 μm, a spinneret needle outer diameter in the range of from 600 to 2000 μm and a spinneret needle inner diameter in the range of from 400 to 1500 μm.

After leaving the hollow-fiber die (i.e. the spinneret) and before entering a coagulation medium, it is preferred that the hollow fiber passes through a climate-controlled zone with defined climatic conditions. The climate-controlled zone can thereby take the form of e.g. an encapsulated chamber. For technical reasons it may be necessary for an air gap to exist between the hollow-fiber die and the climate-controlled zone. This gap should, however, advantageously be as small as possible; the climate-controlled zone preferably directly follows the hollow-fiber die.

In this regard, it is preferred that the hollow fiber has a retention time in the climate-controlled zone of 0.5 to 10 s, whereby the climate-controlled zone contains air with a relative humidity of 40 to 95% and a temperature of 50 to 70° C. The air contained in the climate-controlled zone preferably has a relative humidity of 55 to 85%. It is also preferred that the retention time of the hollow fiber in the climate-controlled zone is 1 to 7 s. In order to establish stable conditions in the climate-controlled zone, the air preferably flows through the climate-controlled zone with a velocity of less than 0.5 m/s and particularly preferably with a velocity in the range from 0.15 to 0.35 m/s.

As the hollow fiber is directed through the climate-controlled zone set to the climatic conditions preferred in the method according to the present disclosure, a precoagulation of the hollow fiber is induced by absorption on the outside of the hollow fiber of the air moisture acting as the non-solvent.

After passing through the climate-controlled zone, the precoagulated hollow fiber may be directed through an aqueous coagulation medium preferably conditioned to 50 to 80° C. in order to complete the formation of the membrane structure and fix the membrane structure. The coagulation medium is preferably conditioned to a temperature in the range from 60 to 75° C. Preferably, the coagulation medium is water or a water bath.

In the coagulation medium, the membrane structure is first precipitated to such an extent that it already has sufficient stability and can be diverted over e.g. deflection rollers or similar means in the coagulation medium. During the further course of the process, the coagulation is completed and the membrane structure stabilised. An extraction of the solvent system and soluble substances takes place here at the same time. In general, a large proportion of the hydrophilic polymer, e.g. of the polyvinylpyrrolidone, is extracted from the membrane structure, so that the coagulation baths serve at the same time as washing or extraction baths. Water is preferably employed as a coagulation or washing medium in these coagulation baths or washing baths.

After extraction, the hollow-fiber membrane thus obtained may be dried and the dried membrane is then coiled. During extraction and drying of the membrane, a slight drawing may be advantageous in order to selectively set certain membrane properties, such as the surface porosity and the separation characteristics. The hollow-fiber membrane according to the present disclosure may then be texturised (if necessary) to improve the exchange properties of the hollow-fiber membrane in the bundle. Finally, the hollow-fiber membrane can be processed using conventional methods, e.g. wound onto a coil or formed directly into bundles with a suitable fiber count and length. Before production of the bundles, supplementary threads, e.g. in the form of multifilament yarns, can be added to the hollow-fiber membranes in order to ensure a spacing of the hollow-fiber membranes relative to one another and a better flow around the individual hollow-fiber membranes in the bundle.

With the method according as described herein, membranes according to the present disclosure having the advantageous structure and properties as described herein are obtained.

Due to the unique combination of properties of the hollow-fiber membranes as described herein, obtained from the method as described herein, the present disclosure further provides a use of the membranes as described herein for microfiltration, nanofiltration or ultrafiltration. "Microfiltration", "nanofiltration" and "ultrafiltration" have the meaning common in the art. Preferably, the uses described herein water filtration or filtration of aqueous media. In this regard, the use according to the present disclosure comprises filtration in pharmaceutical industries, biopharmaceutical industries, medical applications, treatment of residential water, and food and beverage filtration.

The present disclosure may further be illustrated by means of the following exemplary and preferred items:

Item 1: A process for producing a modified microporous membrane, comprising
  (i) Providing a first solution comprising at least one first polymer and at least one epoxy functional compound;
  (ii) Providing a second solution comprising at least one diamine compound;
  (iii) Bringing the first solution and the second solution into contact, thereby obtaining a modified microporous membrane comprising at least one first polymer and the crosslinked reaction product of the at least one epoxy functional compound and the at least one diamine compound;
    wherein the modified microporous membrane is a hollow-fiber membrane;
    and wherein the first solution is a dope solution, the second solution is a bore solution, and bringing the first and second solutions into contact takes place in a spinneret.

Item 2: The process according to any one of the preceding items, wherein the at least one epoxy functional compound is a copolymer comprising building blocks comprising at least one epoxy moiety and at least one aliphatic or aromatic alkoxy function.

Item 3: The process according to item 2, wherein the building blocks comprising at least one epoxy moiety are selected from aliphatic or aromatic glycidyl ethers.

Item 4: The process according to item 2 or item 3, wherein the copolymer further comprises building blocks comprising moieties selected from aliphatic, cyclic or aromatic esters, aliphatic, cyclic or aromatic amides, aliphatic, cyclic or aromatic ethers, aliphatic, cyclic or aromatic sulfones, aliphatic, cyclic or aromatic sulphides, aliphatic, cyclic or aromatic sulphonamides, and/or metal chelating agents.

Item 5: The process according to item 4, the further building blocks are selected from building blocks comprising cyclic amides, cyclic or aliphatic esters, and/or aliphatic or cyclic silanes.

Item 6: The process according to item 4 or item 5, wherein the further building blocks are selected from building blocks comprising pyrrolidones, caprolactames, acetates, and/or formiates.

Item 7: The process according to any one of the preceding items, wherein the at least one epoxy functional compound has the formula (I)

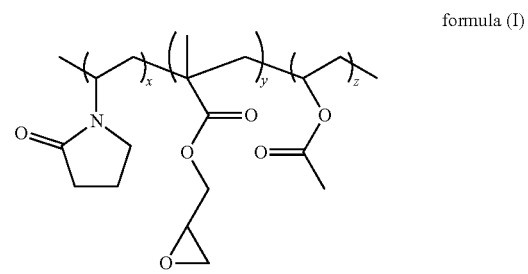

formula (I)

wherein x, y and z are evenly distributed.

Item 8: The process according to item 7, wherein $x+y+z=100$.

Item 9: The process according to any one of the preceding items, wherein the at least one diamine compound is selected from polyamines, polyetheramines, polyamidoamines, and any combination and mixtures thereof.

Item 10: The process according to any one of the preceding items, wherein the at least one first polymer is selected from polyvinylidene fluorides, polyethylenes, and/or polysulfones.

Item 11: The process according to item 10, wherein the at least one first polymer is selected from polysulfones, preferably from polyether sulfone, polyphenylene sulfone or polyaryl ether sulfone.

Item 12: The process according to any one of the preceding items, wherein the first solution comprises at least one second polymer.

Item 13: The process according to item 12, wherein the at least one second polymer is a hydrophilic polymer or copolymer.

Item 14: The process according to item 11 or item 12, wherein the at least one first polymer is selected from polysulfones, and the at least one second polymer is selected from polyvinylpyrrolidones.

Item 15: The process according to any one of the preceding items, wherein the first solution comprises at least one solvent.

Item 16: The process according to item 15, wherein the at least one solvent is selected from dimethylformamide, dimethylacetamide, dimethyl sulfoxide and N-methyl pyrrolidone and any combinations or mixtures thereof.

Item 17: The process according to item 15 or item 16, wherein the first solvent further comprises at least one protic solvent, preferably selected from ε-caprolactam, water, γ-butyrolactone, propylene carbonate and polyalkylene glycol, and any combinations or mixtures thereof.

Item 18: The process according to item 17, wherein the first solution comprises water and/or N-methyl pyrrolidone.

Item 19: The process according to any one of preceding items, wherein the second solution comprises at least one solvent selected from dimethylformamide, dimethylacetamide, dimethyl sulfoxide and N-methyl pyrrolidone and any combinations or mixtures thereof.

Item 20: The process according to item 19, wherein the second solution further comprises at least one protic solvent, preferably selected from ε-caprolactam, water, γ-butyrolactone, propylene carbonate and polyalkylene glycol, and any combinations or mixtures thereof.

Item 21: The process according to item 19 or item 20, wherein the second liquid comprises water and/or N-methyl pyrrolidone.

Item 22: A modified membrane, obtained in the process according to any one of items 1 to 21.

Item 23: Use of the membrane according to item 22 for microfiltration, nanofiltration or ultrafiltration.

Item 24: The use of item 23, wherein the use comprises water filtration or filtration of aqueous media.

Item 25: The use of item 23 or item 25, wherein the use comprises filtration in pharmaceutical industries, biopharmaceutical industries, medical applications, treatment of residential water, and food and beverage filtration.

Item 26: The use according to any one of items 23 to 25, wherein the use comprises virus filtration.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Test Methods

Determination of the Nitrogen Content of a Membrane

The nitrogen content of the membranes is determined according to a Kjehldahl procedure in a corresponding apparatus. About 1 g of a dried membrane sample is carefully weighed into a glass vial to the nearest 0.1 mg. To this sample, a Spezial-Kjeltabs Cu/3,5-tablet and 16 mL conc. sulfonic acid are carefully added. A three-fold determination is carried out. For the blank value determination, three samples are prepared containing only the Spezial-Kjeltabs Cu/3,5-tablet and 16 mL conc. sulfonic acid. The vials are put into a corresponding holder in the Kjehldahl apparatus and the procedure is carried out under vacuum at 400° C. The procedure is deemed finished when a clear, blue solution has formed in the glass vials. Then, the $NH_3$ content in the vials is determined via titration with HCl and the corresponding nitrogen content is calculated.

Determination of Residual Extracts Via UV Spectroscopy

About 1.5 g of membrane samples are weighed into Erlenmeyer flasks to the nearest 0.1 mg. 150 mL ultra-pure water which was pre-boiled and cooled down to room temperature was added. The closed flask is then shaken for 1 h at a temperature of 70° C. and cooled down to room temperature afterwards. Then, the eluent is subjected to UV spectroscopy of wavelengths in the range of from 350 nm to 250 nm in intervals of 10 nm. As measured value, the highest extinction in said wavelength area is taken.

Example 1: Modified Hollow Fiber Membrane

A dope solution having the composition as set forth in table 1 was set up. The VP/VA/GMA copolymer used in table 1 in is a copolymer obtained from Ashland having the general formula 1 below, wherein x, y and z are randomly distributed, and wherein x+y+z=100.

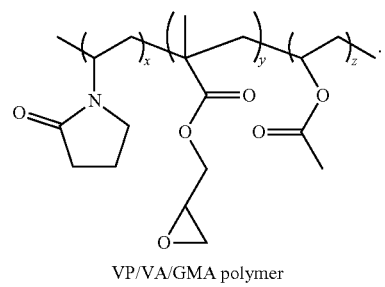

Formula 1

VP/VA/GMA polymer

Using a bore liquid comprising a diamine (Jeffamine ED-2003) according to the composition set forth in table 1, spinning of a hollow fiber membrane was carried out through a spinneret having a temperature of 50° C., and at a spinning speed of 40 m/min. The spinning has been done at 40 m/min, with a coagulation bath temperature of 65° C. The bore liquid had a temperature of 35° C. The residence time for the reaction between the two components at the interface between bore liquid and polymer dope was estimated with 38 s. The spinneret temperature was 50° C. The counterpart to the epoxy functional compound according to formula 1 above (i.e. the diamine) was added to the bore liquid (5% in a NMP/water mixture). The crosslinking between epoxide (VP/VA/GMA) and diamine (Jeffamine ED-2003) started immediately after the outlet of the spinneret when dope solution and bore liquid got in contact.

All membranes obtained had a wall thickness of approximately 49 μm and a lumen between 300-370 μm.

TABLE 1

Composition of the dope solution.

|  | amount in % |
|---|---|
| NMP | 62.96 |
| PES E6020 | 19.00 |
| PVP K30 | 10.03 |
| PVP K90 | 1.27 |
| Water | 4.74 |
| VP/VA/GMA | 2.00 |

Comparative Example 1

As comparative example, example 1 war repeated with a composition lacking VP/VA/GMA in the dope solution and the diamine in the bore solution.

The nitrogen contents of the membranes according to ex. 1 and comp. ex. 1 were then determined. Also, membranes of ex. 1 and comp. ex. 1 were then treated for 7 d in a Soxhlet apparatus, and the nitrogen content was determined after this extraction procedure. The results are summarized in table 2.

TABLE 2

Nitrogen content of membranes.

|  | Ex. 1 | Comp. Ex. 1 |
|---|---|---|
| N content of untreated membrane g/kg membrane] | 5.54 | 3.21 |
| N content of membrane after Soxhlet extraction [g/kg membrane] | 4.99 | 2.46 |

It is evident that the nitrogen content of the membrane according to ex. 1 is much higher than the corresponding value of comp. ex. 1, indicating that nitrogen has been built into the membrane. This is evidence for the crosslinking of the epoxy functionality in the VP/VA/GMA unit and the diamine in the membrane structure.

Similarly, the residual extracts of these membranes were determined via UV spectroscopy. The results are summarized in table 3.

TABLE 3

UV-values of extractables of the membranes.

|  | Ex. 1 | Comp. Ex. 1 |
|---|---|---|
| UV value of extractable of untreated membrane | 5.54 | 3.21 |
| UV value of extractable of membrane after Soxhlet extraction | 4.99 | 2.46 |

Table 3 shows that less VP/VA/GMA than the usual PVP is washed out of the membrane. This is clear indication for a crosslinked VP/VA/GMA and a stable, hydrophilic, low extractable membrane.

Finally, the membranes according to ex. 1 yielded a 100% retention of 15 nm gold particles, compared to a 57% retention obtained by the membranes according to comp. ex. 1.

The invention claimed is:

1. A process for producing a modified microporous membrane, comprising
   (i). Providing a first solution comprising at least one first polymer and at least one epoxy functional compound;
   (ii). Providing a second solution comprising at least one diamine compound;
   (iii). Bringing the first solution and the second solution into contact, thereby obtaining a modified microporous membrane comprising at least one first polymer and the crosslinked reaction product of the at least one epoxy functional compound and the at least one diamine compound;
   wherein the modified microporous membrane is a hollow-fiber membrane; and
   wherein the first solution is a dope solution, the second solution is a bore solution, and bringing the first and second solutions into contact takes place in a spinneret.

2. The process according to claim 1, wherein the at least one epoxy functional compound is a copolymer comprising building blocks comprising at least one epoxy moiety and at least one aliphatic alkoxy function or aromatic alkoxy function.

3. The process according to claim 2, wherein the building blocks comprising at least one epoxy moiety are selected from aliphatic glycidyl ethers or aromatic glycidyl ethers.

4. The process according to claim 2, wherein the copolymer further comprises building blocks comprising moieties selected from aliphatic esters, cyclic esters, or aromatic esters; aliphatic amides, cyclic amides, or aromatic amides; aliphatic ethers, cyclic ethers, or aromatic ethers; aliphatic sulfones, cyclic sulfones, or aromatic sulfones; aliphatic sulphides, cyclic sulphides, or aromatic sulphides; aliphatic sulphonamides, cyclic sulphonamides, or aromatic sulphonamides; and/or metal chelating agents.

5. The process according to claim 1, wherein the at least one epoxy functional compound has the formula

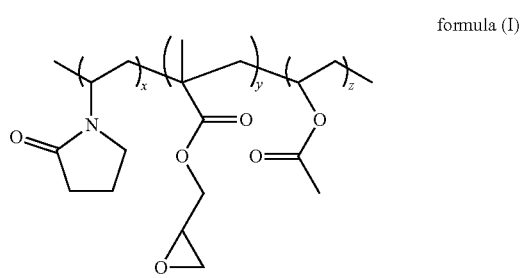

formula (I)

wherein x, y and z are evenly distributed.

6. The process according to claim 5, wherein x+y+z=100.

7. The process according to claim 1, wherein the at least one diamine compound is selected from polyamines, polyetheramines, polyamidoamines, and any combination and mixtures thereof.

8. The process according to claim 1, wherein the at least one first polymer is selected from polyvinylidene fluorides, polyethylenes, and/or polysulfones.

9. The process according to claim 8, wherein the at least one first polymer is selected from polysulfones.

10. The process according to claim 1, wherein the first solution comprises at least one second polymer.

11. The process according to claim 10, wherein the at least one first polymer is selected from polysulfones, and the at least one second polymer is selected from polyvinylpyrrolidones.

12. The process according to claim 1, wherein the first solution comprises at least one solvent.

13. A modified membrane, obtained in the process according to claim 1.

14. A method for microfiltration, nanofiltration or ultrafiltration, said method comprising contacting water or an aqueous media with a membrane according to claim 13.

15. The method of claim 14, wherein said microfiltration, nanofiltration or ultrafiltration comprises virus filtration.

16. The process according to claim 9, wherein said polysulfones are selected from polyether sulfone, polyphenylene sulfone or polyaryl ether sulfone.

17. The process according to claim 10, wherein said at least one second polymer is a hydrophilic polymer or copolymer.

18. The process according to claim 12, wherein said at least one solvent is selected from dimethylformamide, dimethylacetamide, dimethyl sulfoxide and N-methyl pyrrolidone and any combinations or mixtures thereof.

* * * * *